United States Patent
Kim et al.

(10) Patent No.: US 11,884,139 B2
(45) Date of Patent: Jan. 30, 2024

(54) AIR VENTILATION APPARATUS FOR VEHICLE USING COANDA EFFECT

(71) Applicants: HYUNDAI MOBIS Co., Ltd., Seoul (KR); ITW EF&C Korea LLC., Incheon (KR)

(72) Inventors: Seung Cheol Kim, Yongin-si (KR); Byung Jo Kim, Incheon (KR)

(73) Assignees: HYUNDAI MOBIS Co., Ltd., Seoul (KR); ITW EF&C Korea LLC., Incheon (KR)

( * ) Notice: Subject to any disclaimer, the term of this patent is extended or adjusted under 35 U.S.C. 154(b) by 672 days.

(21) Appl. No.: 16/950,748

(22) Filed: Nov. 17, 2020

(65) Prior Publication Data
US 2021/0146757 A1  May 20, 2021

(30) Foreign Application Priority Data
Nov. 18, 2019 (KR) .......................... 10-2019-0148135

(51) Int. Cl.
*B60H 1/34* (2006.01)
(52) U.S. Cl.
CPC ......... *B60H 1/3414* (2013.01); *B60H 1/3421* (2013.01); *B60H 2001/3471* (2013.01); *Y10T 137/2202* (2015.04)
(58) Field of Classification Search
CPC ................ B60H 1/3414; B60H 1/3421; B60H 2001/3471; Y10T 137/2202
USPC ........................................................ 137/829
See application file for complete search history.

(56) References Cited

U.S. PATENT DOCUMENTS

| | | | | |
|---|---|---|---|---|
| 4,880,206 A | * | 11/1989 | Lungu | B60H 1/00485 251/129.21 |
| 6,792,976 B2 | * | 9/2004 | Butera | F16K 11/022 137/829 |
| 6,941,967 B2 | * | 9/2005 | Butera | B60H 1/00842 137/829 |
| 10,408,490 B2 | * | 9/2019 | Londiche | B60H 1/3414 |
| 2006/0223430 A1 | * | 10/2006 | Shibata | F24F 13/075 454/155 |
| 2016/0250909 A1 | * | 9/2016 | Schneider | B60H 1/3421 454/155 |
| 2018/0215238 A1 | * | 8/2018 | Lee | B60H 1/3421 |
| 2019/0126726 A1 | * | 5/2019 | Uhlenbusch | F24F 13/10 |

FOREIGN PATENT DOCUMENTS

KR   10-1950311 B1   2/2019
WO   WO-2008128820 A1 * 10/2008

* cited by examiner

*Primary Examiner* — John Bastianelli
(74) *Attorney, Agent, or Firm* — NSIP Law

(57) ABSTRACT

An air ventilation apparatus for a vehicle using a Coanda effect according to one embodiment of the present invention includes a duct housing having a hollow shape in which an air inlet is formed in one end portion thereof and an air outlet is formed in the other end portion thereof, a cover member having one end portion coupled to surround the other end portion of the duct housing and having the other end portion which is coupled to the board and in which a communication hole is formed to communicate with the discharge port, and an air guide member which is disposed inside the cover member, is hinge-coupled to the duct housing so as to be vertically rotatable, and has a through-hole through which the air outlet communicates with the communication hole.

19 Claims, 13 Drawing Sheets

AIR VENTILATION APPARATUS FOR VEHICLE USING COANDA EFFECT

CROSS-REFERENCE TO RELATED APPLICATION

This application claims priority to and the benefit of Korean Patent Application No. 10-2019-0148135, filed on Nov. 18, 2019, the disclosure of which is incorporated herein by reference in its entirety.

BACKGROUND

1. Field of the Invention

The present invention relates to an air ventilation apparatus for a vehicle, and particularly, to an air ventilation apparatus for a vehicle capable of having a slim structure.

2. Discussion of Related Art

A wind direction adjustment air ventilation apparatus is disposed in a vehicle cockpit, and in order to adjust a wind direction, a user changes the wind direction and opens or closes a discharge port using a mechanical mechanism or directly and manually using a wind direction adjustment wing and a knob exposed at a dashboard.

Such a wind direction adjustment wing includes a lateral direction control wing for adjusting a lateral flow of air and a vertical direction adjustment wing for adjusting a vertical flow of air.

An air ventilation apparatus not only performs an original function related to air circulation in a vehicle but also plays a big role in design of a cockpit in itself.

In particular, according to the recent design trend of the cockpit, a discharge port of an air ventilation apparatus is required to have a height (vertical width) of 15 mm or less.

However, when a vertical width of a discharge port is 15 mm or less, a wind direction adjustment wing method according to the conventional method is difficult to apply without any change due to a narrow mechanism. In addition, since an air pressure of the discharge port for air ventilation is increased, it is expected that there is a problem in implementing an ultra-slim air ventilation apparatus required for a next generation air ventilation apparatus.

SUMMARY OF THE INVENTION

The present invention is directed to providing an air ventilation apparatus for a vehicle using a Coanda effect, which is made thinner by reducing a vertical length of a discharge port for air ventilation and is also able to adjust a vertical flow of air.

To solve the problems, according to the present invention, an air ventilation apparatus for a vehicle using a Coanda effect that is mounted inside a board in a vehicle to discharge air into the vehicle through a discharge port formed in the board includes a duct housing having a hollow shape in which an air inlet is formed in one end portion thereof and an air outlet is formed in the other end portion thereof, a cover member having one end portion coupled to surround the other end portion of the duct housing and having the other end portion which is coupled to the board and in which a communication hole is formed to communicate with the discharge port, and an air guide member which is disposed inside the cover member, is hinge-coupled to the duct housing so as to be vertically rotatable, and has a through-hole through which the air outlet communicates with the communication hole, wherein, when an inner circumferential surface of the air guide member, an inner circumferential surface of the communication hole, and an inner circumferential surface of the discharge port form a continuous curved surface due to rotation of the air guide member, air supplied from the air inlet is discharged into the vehicle through the discharge port by turning in a direction in which the continuous curved surface is formed.

A first air guide block may be formed at an upper side of the inner circumferential surface of the air guide member, a second air guide block may be formed at a lower side of the inner circumferential surface of the air guide member, the through-hole may be formed between the first air guide block and the second air guide block, and one of the first air guide block and the second air guide block may form a continuous curved surface together with the inner circumferential surface of the communication hole and the inner circumferential surface of the discharge port due to the rotation of the air guide member.

A lower surface of the first air guide block and an upper surface of the second air guide block may be formed as curved surfaces.

A vertical size of the through-hole may be greater than a vertical size of the communication hole, and when one of the first air guide block and the second air guide block forms the continuous curved surface together with the inner circumferential surface of the communication hole due to the rotation of the air guide member, the other one thereof may move away from the communication hole.

A connection portion between an inner circumferential surface of the cover member and the communication hole may have an angled shape.

The continuous curved surface, which is formed by one of the first air guide block and the second air guide block, the inner circumferential surface of the communication hole, and the inner circumferential surface of the discharge port, may be formed to curve more gently than the continuous curved surface formed by an inner circumferential surface of the cover member, the inner circumferential surface of the communication hole, and the inner circumferential surface of the discharge port.

When both the first air guide block and the second air guide block are spaced apart from the inner circumferential surface of the communication hole, the air supplied from the air inlet may be discharged in a linear flow through the discharge port.

The cover member may be formed in a dome shape, a blocking guide part may be formed at the other end portion of the duct housing and may be disposed inside the cover member to form the air outlet therein, an inner circumferential surface of the cover member and the blocking guide part may be spaced apart from each other to form a seating space, and when one of the first air guide block and the second air guide block forms the continuous curved surface together with the inner circumferential surface of the communication hole due to the rotation of the air guide member, the other one thereof may be moved away from the communication hole and inserted into the seating space formed between the inner circumferential surface of the cover member and the blocking guide part.

The air ventilation apparatus may further include a lateral wind direction adjustment plate mounted to be laterally rotatable inside the duct housing, wherein the lateral wind direction adjustment plate is disposed closer to the air inlet than the cover member.

The air ventilation apparatus may further include an actuator configured to vertically rotate the air guide member.

To solve the problems, according to the present invention, an air ventilation apparatus for a vehicle using a Coanda effect that is mounted inside a board in a vehicle to discharge air into the vehicle through a discharge port formed in the board includes a duct housing having a hollow shape in which an air inlet is formed in one end portion thereof and an air outlet is formed in the other end portion thereof, a cover member having one end portion coupled to surround the other end portion of the duct housing and having the other end portion which is coupled to the board and in which a communication hole is formed to communicate with the discharge port, an air guide member which is disposed inside the cover member, is hinge-coupled to the duct housing so as to be vertically rotatable, and has a through-hole through which the air outlet communicates with the communication hole, and an actuator configured to vertically rotate the air guide member, wherein an inner circumferential surface of the air guide member, an inner circumferential surface of the communication hole, and an inner circumferential surface of the discharge port form a continuous curved surface so that air supplied from the air inlet is discharged into the vehicle through the discharge port by turning in a direction in which the continuous curved surface is formed, and the air guide member is rotated to block a curved flow in which the air supplied from the air inlet moves along an inner circumferential surface of the cover member and the inner circumferential surface of the communication hole.

A third air guide block may be formed at an upper side of the inner circumferential surface of the air guide member, a fourth air guide block may be formed at a lower side of the inner circumferential surface of the air guide member, the through-hole may be formed between the third air guide block and the fourth air guide block, and due to the rotation of the air guide member, one of the third air guide block and the fourth air guide may block a curved flow in which the air supplied from the air inlet moves along the inner circumferential surface of the cover member and the inner circumferential surface of the communication hole.

Due to the rotation of the air guide member, one of the third air guide block and the fourth air guide block may be disposed to protrude further toward a center of the communication hole than the inner circumferential surface of the communication hole and to block the curved flow of the air supplied from the air inlet.

A vertical size of the through-hole may be greater than a vertical size of the communication hole, and when one of the third air guide block and the fourth air guide block blocks the curved flow of the air due to the rotation of the air guide member, the other one thereof may move away from the communication hole.

Facing surfaces of the third air guide block and the fourth air guide block may form an angled shape together with the inner circumferential surface and an outer circumferential surface of the cover member.

When the third air guide block and the fourth air guide block are disposed adjacent to each other outside the inner circumferential surface of the communication hole, the air supplied from the air inlet may be discharged in a linear flow through the discharge port.

The cover member may be formed in a dome shape, a blocking guide part may be formed at the other end portion of the duct housing and may be disposed inside the cover member to form the air outlet therein, the inner circumferential surface of the cover member and the blocking guide part may be spaced apart from each other to form a seating space, and when one of the third air guide block and the fourth air guide block blocks the curved flow of the air due to the rotation of the air guide member, the other one thereof may be moved away from the communication hole and inserted into the seating space formed between the inner circumferential surface of the cover member and the blocking guide part.

The air ventilation apparatus may further include a lateral wind direction adjustment plate mounted to be laterally rotatable inside the duct housing, wherein the lateral wind direction adjustment plate is disposed closer to the air inlet than the cover member.

The air ventilation apparatus may further include the actuator configured to vertically rotate the air guide member.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

First Embodiment

Figure 1:
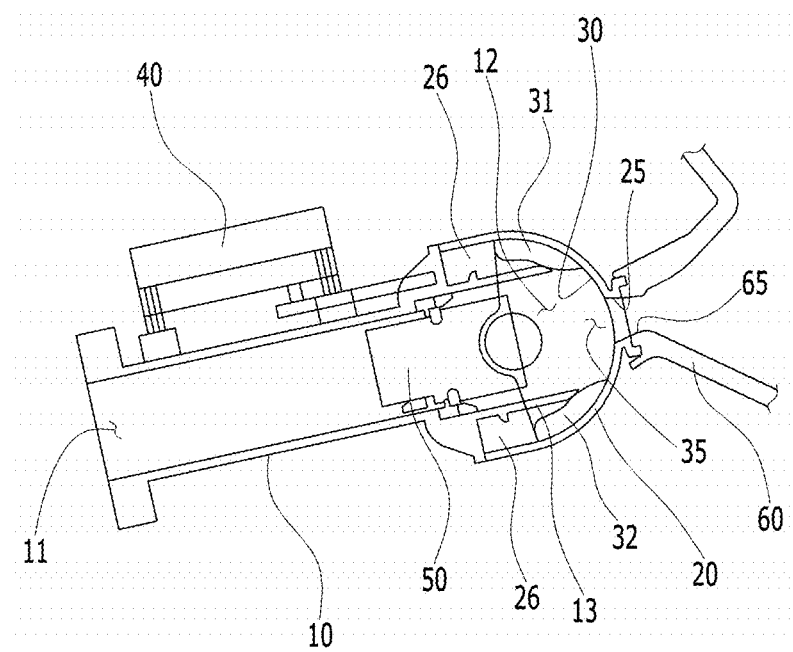
FIG. 1 is a cross-sectional side view of an air ventilation apparatus for a vehicle according to a first embodiment of the present invention.
Figure 2:
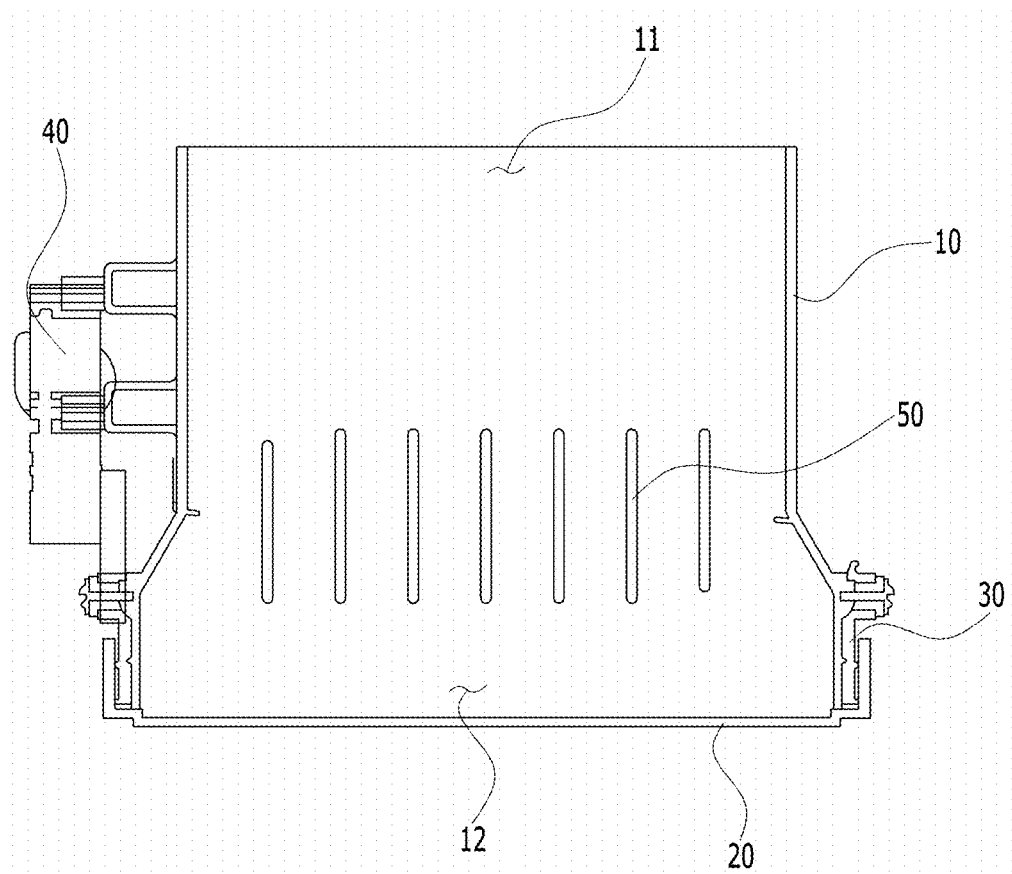
FIG. 2 is a cross-sectional plan view of the air ventilation apparatus for a vehicle according to the first embodiment of the present invention.
Figure 3:
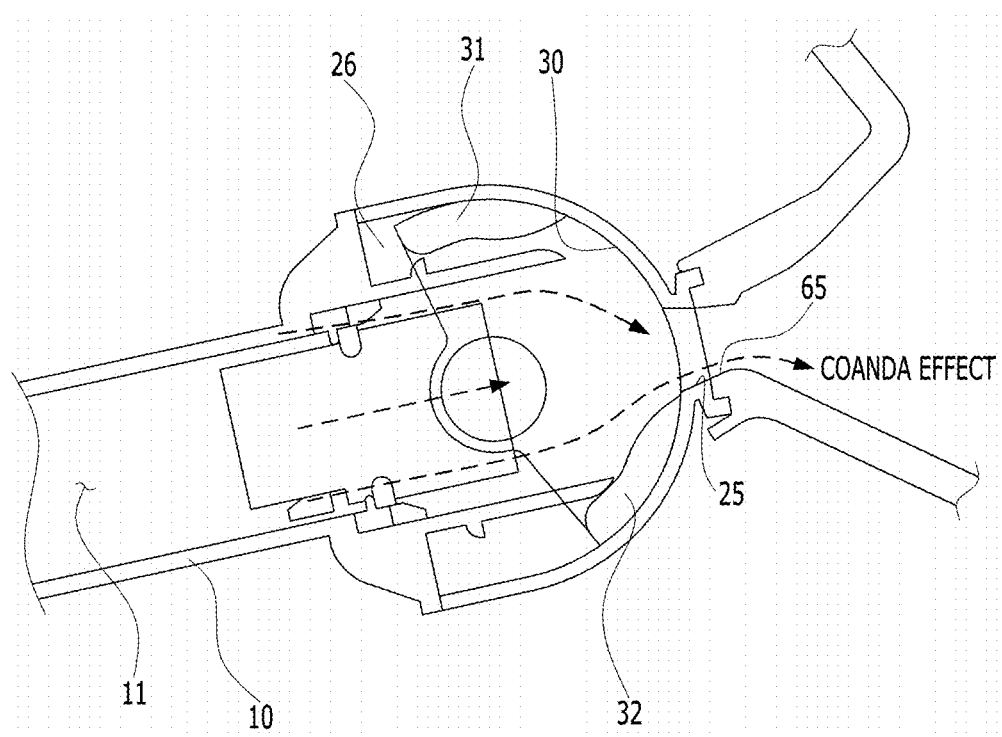
FIG. 3 is a cross-sectional side view illustrating a linear flow state of air by the air ventilation apparatus for a vehicle according to the first embodiment of the present invention.
Figure 4:
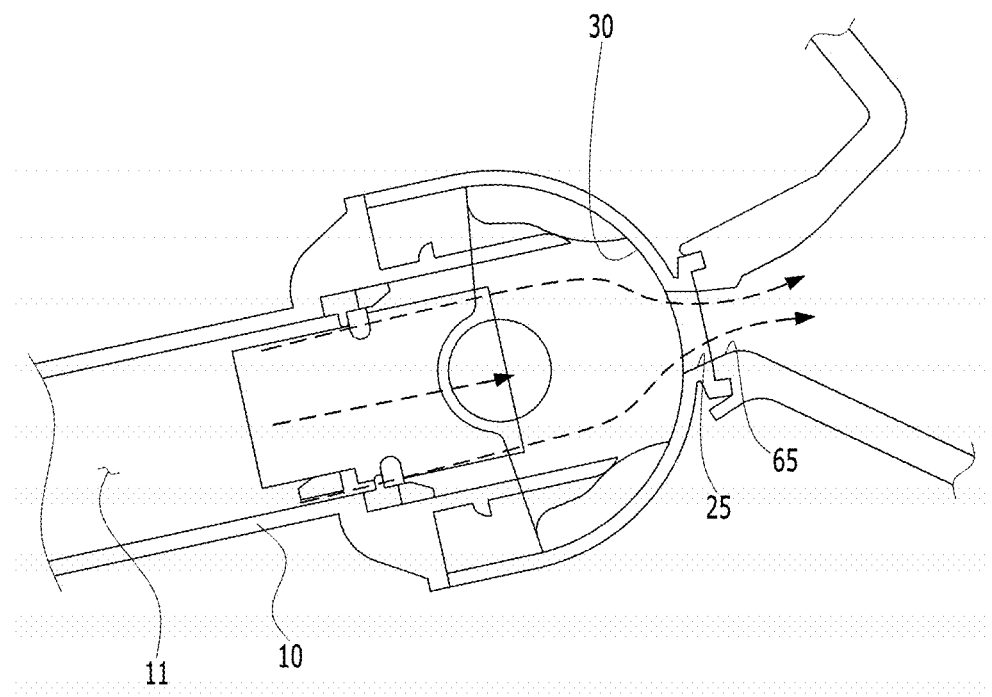
FIG. 4 is a cross-sectional side view illustrating a downward flow state of air by the air ventilation apparatus for a vehicle according to the first embodiment of the present invention.
Figure 5:
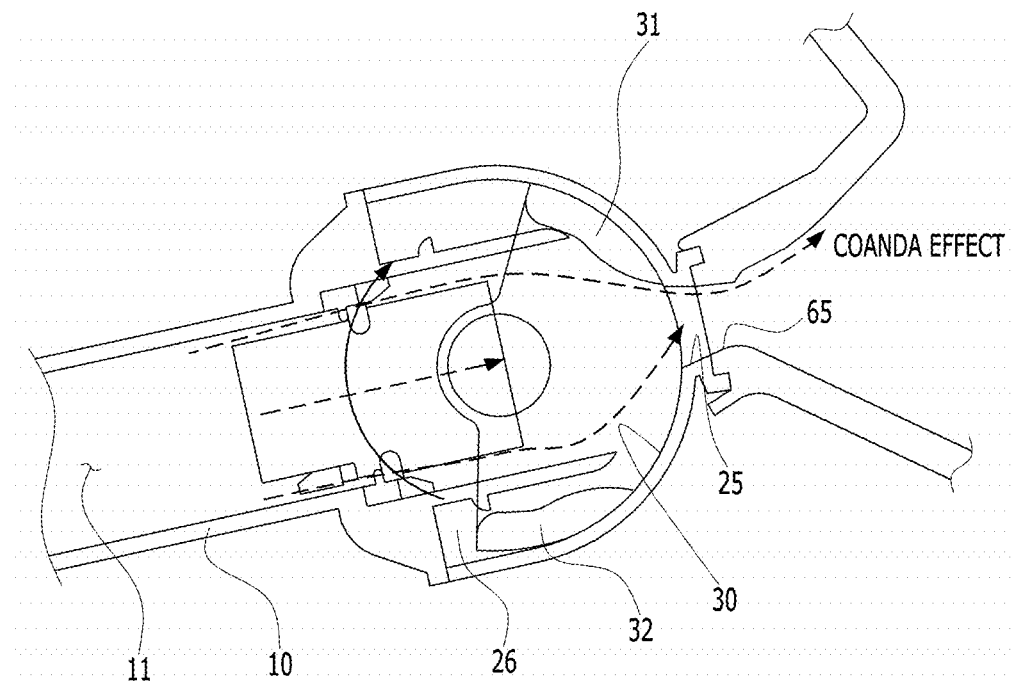
FIG. 5 is a cross-sectional side view illustrating an upward flow state of air by the air ventilation apparatus for a vehicle according to the first embodiment of the present invention.

FIG. 1 is a cross-sectional side view of an air ventilation apparatus for a vehicle according to a first embodiment of the present invention. FIG. 2 is a cross-sectional plan view of the air ventilation apparatus for a vehicle according to the first embodiment of the present invention. FIG. 3 is a cross-sectional side view illustrating a linear flow state of air by the air ventilation apparatus for a vehicle according to the first embodiment of the present invention. FIG. 4 is a cross-sectional side view illustrating a downward flow state of air by the air ventilation apparatus for a vehicle according to the first embodiment of the present invention. FIG. 5 is a cross-sectional side view illustrating an upward flow state of air by the air ventilation apparatus for a vehicle according to the first embodiment of the present invention. FIGS. 6A to 6D shows cross-sectional plan views for describing an operation of a lateral wind direction adjustment plate in the air ventilation apparatus for a vehicle according to the first embodiment of the present invention.

The air ventilation apparatus for a vehicle using a Coanda effect of the present invention relates to an air ventilation apparatus for a vehicle which is mounted inside a board 60 in a vehicle to discharge air into the vehicle through a discharge port 65 formed in the board 60.

The board 60 refers not only to a dashboard mounted inside a vehicle but also to various parts in which the air ventilation apparatus is mounted.

A Coanda effect mentioned in the present invention refers to a phenomenon in which a fluid is attracted to a curved surface to flow and means that, when a fluid jet is spayed, the fluid jet flows along a surface adjacent to a nozzle under the influence of ambient pressure.

As shown in FIGS. 1 and 2, the air ventilation apparatus for a vehicle of the present invention includes a duct housing 10, a cover member 20, an air guide member 30, an actuator 40, and a lateral wind direction adjustment plate 50.

The duct housing 10 is a part disposed inside the board 60 and has a hollow shape.

The duct housing 10 has an air inlet 11, through which air enters, formed in one end portion thereof, and an air outlet 12, through which air exits, formed in the other end portion thereof.

One end portion of the cover member 20 is coupled to surround the other end portion of the duct housing 10, and the other end portion thereof is coupled to the board 60.

A communication hole 25 communicating with the discharge port 65 is formed in the other end portion of the cover member 20 coupled to the board 60.

That is, when the other end portion of the cover member 20 is coupled to the board 60, the discharge port 65 formed in the board 60 communicates with the communication hole 25 formed in the cover member 20.

In the present embodiment, the cover member 20 has a dome shape, and the other end portion of the duct housing 10 is disposed therein.

A blocking guide part 13 is formed at the other end portion of the duct housing 10 and is disposed inside the cover member 20 having the dome shape to form the air outlet 12 therein. That is, a part of the duct housing 10 disposed inside the cover member 20 is the blocking guide part 13.

An inner circumferential surface of the cover member 20 and the blocking guide part 13 are spaced apart from each other to form a seating space 26.

The air guide member 30 is disposed inside the cover member 20 and hinge-coupled to the duct housing 10 so as to be vertically rotatable.

A through-hole 35, through which the air outlet 12 and the communication hole 25 communicate with each other, is formed in the air guide member 30.

A first air guide block 31 is formed at an upper side of an inner circumferential surface of the air guide member 30, and a second air guide block 32 is formed at a lower side thereof.

The through-hole 35 is formed between the first air guide block 31 and the second air guide block 32.

The actuator 40 is formed as a motor or the like and vertically rotates the air guide member 30.

Of course, in some cases, a user may directly rotate the air guide member 30 using a lever or the like without the actuator 40 driven by electric power.

Due to the vertical rotation of the air guide member 30, as shown in FIGS. 3 and 5, the inner circumferential surface of the air guide member 30, an inner circumferential surface of the communication hole 25, and an inner circumferential surface of the discharge port 65 form a continuous streamlined curved surface.

More specifically, due to the rotation of the air guide member 30, one of the first air guide block 31 and the second air guide block 32 forms a continuous curved surface together with the inner circumferential surface of the communication hole 25 and the inner circumferential surface of the discharge port 65.

As described above, when the continuous curved surface is formed by the first air guide block 31 or the second air guide block 32, air supplied from the air inlet 11 turns in a direction in which the curved surface is formed and is discharged into a vehicle through the discharge port 65.

Here, the air turning along the curved surface to be discharged is caused by the Coanda effect as described above.

In order to better facilitate a flow of air supplied from the air inlet 11, a lower surface of the first air guide block 31 and an upper surface of the second air guide block 32 may be formed to have a curved shape consecutively connected to the inner circumferential surface of the communication hole 25.

The through-hole 35 formed in the cover member 20 is formed to have a vertical size greater than that of the communication hole 25.

Therefore, when one of the first air guide block 31 and the second air guide block 32 forms the continuous curved surface together with the inner circumferential surface of the communication hole 25 due to the rotation of the air guide member 30, the other one is disposed at a position away from the communication hole 25.

Accordingly, the first air guide block 31 or the second air guide block 32 that is farther away from the communication hole 25 can be prevented from obstructing a flow of air.

In the present embodiment, one of the first air guide block 31 and the second air guide block 32 that is farther away from the communication hole 25 due to the rotation of the air guide member 30 is inserted into the seating space 26 formed between the inner circumferential surface of the cover member 20 and the blocking guide part 13.

Accordingly, air introduced from the air inlet 11 is not affected by the first air guide block 31 or the second air guide block 32 inserted into and disposed in the seating space 26 and is discharged through the discharge port 65.

In the present invention, a connection portion between the inner circumferential surface of the cover member 20 and the communication hole 25 is formed in an angled shape rather than a curved shape.

Accordingly, in a state in which the first air guide block 31 or the second air guide block 32 is not disposed consecutively with the inner circumferential surface of the communication hole 25, a flow of air due to a Coanda effect is prevented from occurring.

In addition, a curved surface formed by one of the first air guide block 31 and the second air guide block 32 and the inner circumferential surface of the communication hole 25 is formed to curve more gently than a curved surface formed by the inner circumferential surface of the cover member 20, the inner circumferential surface of the communication hole 25, and the inner circumferential surface of the discharge port 65.

Therefore, when the first air guide block 31 or the second air guide block 32 is disposed consecutively with the inner circumferential surface of the communication hole 25, air flows along a gentle streamlined curved surface, thereby better facilitating a vertical flow of air due to a Coanda effect.

As shown in FIG. 4, when both the first air guide block 31 and the second air guide block 32 are spaced apart from the inner circumferential surface of the communication hole 25, since the Coanda effect is not caused, air supplied from the air inlet 11 is discharged in a linear flow through the discharge port 65.

A plurality of lateral wind direction adjustment plates 50 are provided and mounted to be laterally rotatable inside the duct housing 10.

As shown in FIG. 5, a flow of air discharged through the discharge port 65 may be controlled by the lateral rotation of the lateral wind direction adjustment plate 50 of as shown in FIGS. 6A to 6D.

The lateral wind direction adjustment plate 50 is disposed closer to the air inlet 11 than the cover member 20.

Therefore, a lateral flow of air supplied through the air inlet 11 is first determined by the lateral wind direction adjustment plate 50, and a vertical flow thereof is determined by the vertical rotation of the cover member 20.

Hereinafter, an operation process of the present invention configured as described above will be described.

First, when air discharged from the discharge port 65 is to be discharged downward, as shown in FIG. 3, the cover member 20 is rotated counterclockwise.

The cover member 20 is rotated counterclockwise to allow the second air guide block 32 formed at a lower side to be disposed consecutively with the inner circumferential surface of the communication hole 25 to form a curved surface.

Accordingly, the upper surface of the second air guide block 32 positioned at a lower side, the inner circumferential surface of the communication hole 25, and the inner circumferential surface of the discharge port 65 form a continuous curved surface.

The first air guide block 31 positioned at an upper side is inserted into the seating space 26 due to the rotation of the cover member 20.

When air is introduced from the air inlet 11, the air flows by being attracted to the continuous curved surface formed by the upper surface of the second air guide block 32, the inner circumferential surface of the communication hole 25, and the inner circumferential surface of the discharge port 65. In this case, while a Coanda effect is caused, air discharged through the discharge port 65 is discharged in a downward direction in which the curved surface is formed.

Air moving to an upper side of the air outlet 12 rarely causes a Coanda effect due to the angled connection portion between the inner circumferential surface of the cover member 20 and the communication hole 25. A flow direction of the air moving to the upper side of the air outlet 12 turns downward, and thus, the air is discharged in a downward direction of the discharge port 65.

As shown in FIG. 4, when air discharged from the discharge port 65 is to be normally discharged, i.e., discharged in a linear flow without turning, the cover member 20 may be rotated to allow both the first air guide block 31 and the second air guide block 32 to be spaced apart from the inner circumferential of the communication hole 25.

In this case, both the first air guide block 31 and the second air guide block 32 are not connected consecutively with the inner circumferential surface of the communication hole 25.

Accordingly, the air supplied through the air inlet 11 is discharged in a linear flow through the discharge port 65 without the Coanda effect.

As shown in FIG. 5, when air discharged from the discharge port 65 is to be discharged upward, the cover member 20 is rotated clockwise.

When the cover member 20 is rotated clockwise, the first air guide block 31 formed at an upper side is disposed consecutively with the inner circumferential surface of the communication hole 25 to form a curved surface.

Accordingly, the lower surface of the first air guide block 31 positioned at an upper side, the inner circumferential surface of the communication hole 25, and the inner circumferential surface of the discharge port 65 form a continuous curved surface.

The second air guide block 32 positioned at a lower side is inserted into the seating space 26 due to the rotation of the cover member 20.

When air is introduced from the air inlet 11, the air flows by being attracted to the continuous curved surface formed by the lower surface of the first air guide block 31, the inner circumferential surface of the communication hole 25, and the inner circumferential surface of the discharge port 65. In this case, while a Coanda effect is caused, air discharged through the discharge port 65 is discharged in an upward direction in which the curved surface is formed.

Air moving to a lower side of the air outlet 12 barely causes a Coanda effect due to the angled connection portion between the inner circumferential surface of the cover member 20 and the communication hole 25. A flow direction of the air moving to the lower side of the air outlet 12 turns upward, and thus, the air is discharged in an upward direction of the discharge port 65.

Figure 6A:
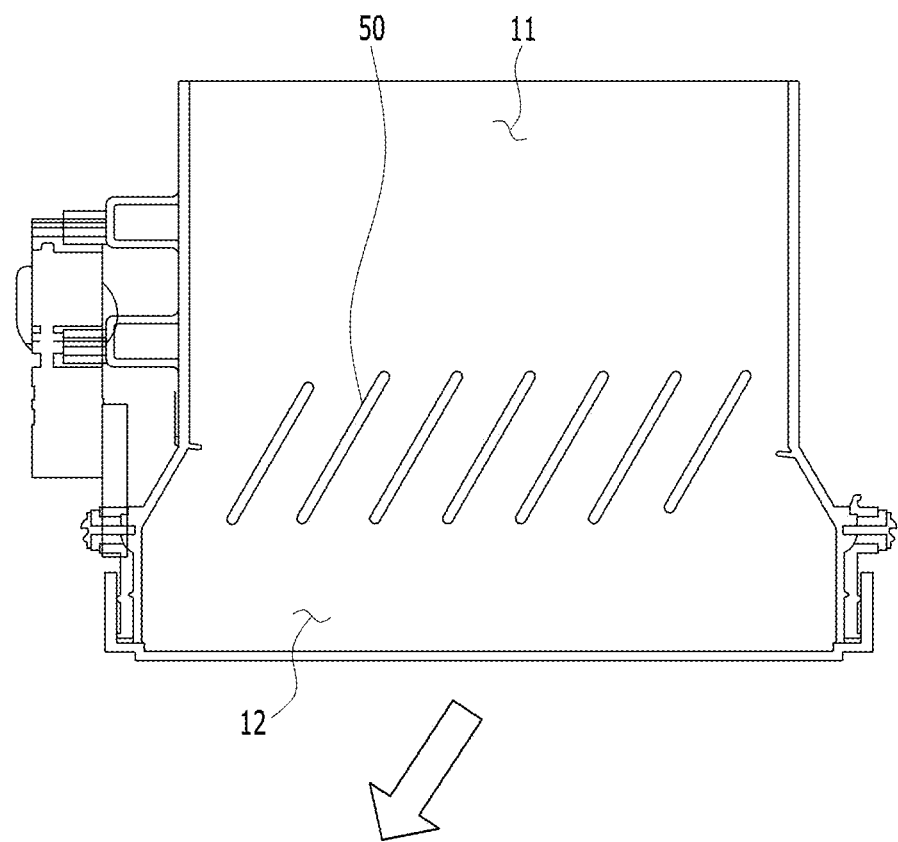
FIGS. 6A to 6D shows cross-sectional plan views for describing an operation of a lateral wind direction adjustment plate in the air ventilation apparatus for a vehicle according to the first embodiment of the present invention.
Figure 6B:
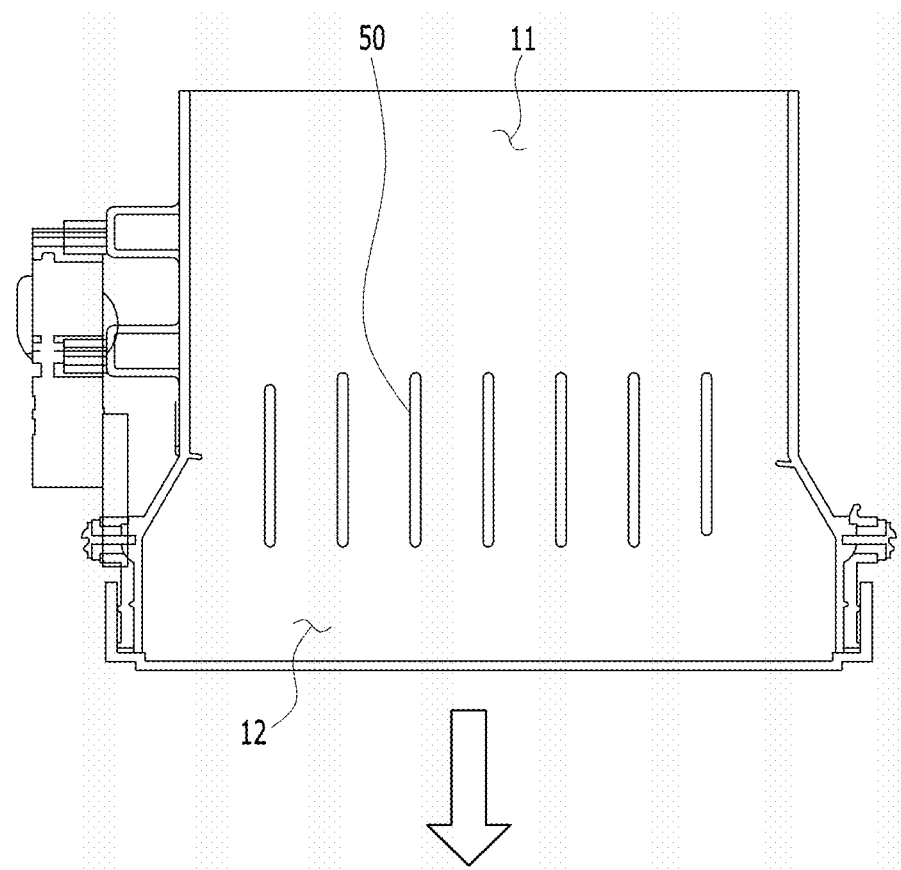
Figure 6C:
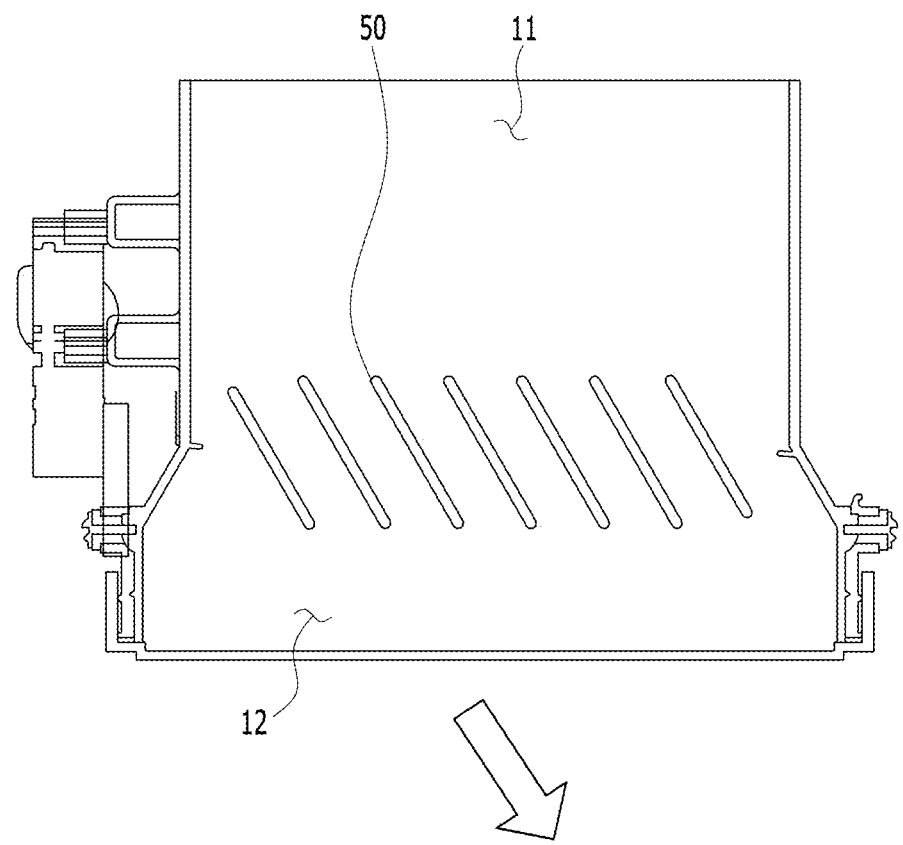
Figure 6D:
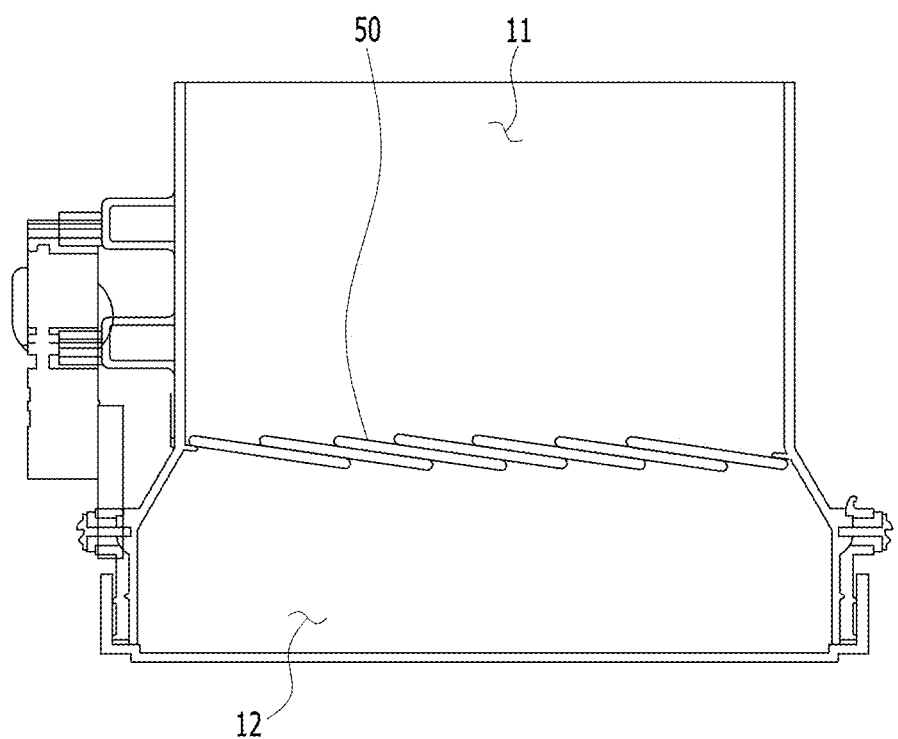

Meanwhile, due to the rotation of the lateral wind direction adjustment plate 50, as shown in FIGS. 6A to 6C, air discharged through the air outlet 12 may be turned leftward, forward, or rightward, and as shown in FIG. 6D, the air outlet 12 may be closed.

As described above, according to the present invention, a vertical direction of air discharged through the discharge port 65 can be controlled through a Coanda effect without a conventional vertical wind direction adjustment wing, thereby reducing a vertical width of the discharge port 65 to implement a slim design.

Second Embodiment

Figure 7:
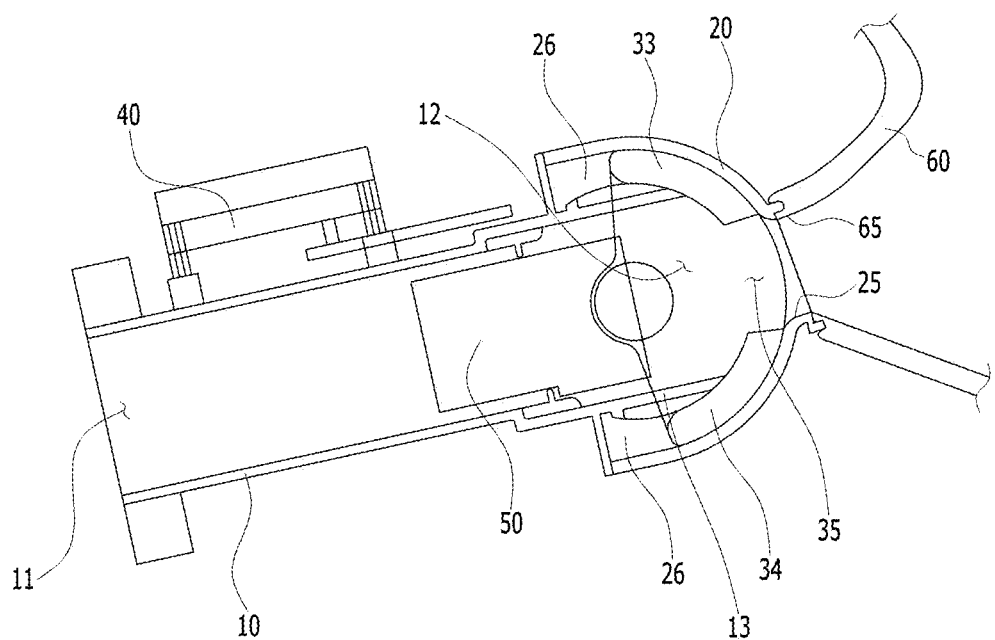
FIG. 7 is a cross-sectional side view of an air ventilation apparatus for a vehicle according to a second embodiment of the present invention.
Figure 8:
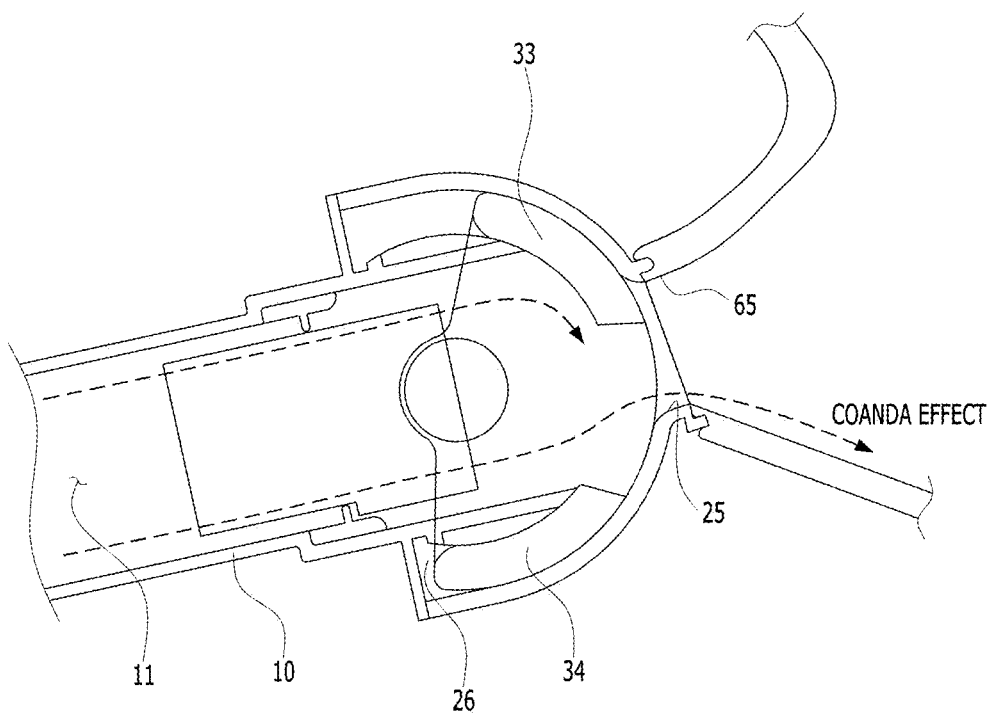
FIG. 8 is a cross-sectional side view illustrating a linear flow state of air by the air ventilation apparatus for a vehicle according to the second embodiment of the present invention.
Figure 9:
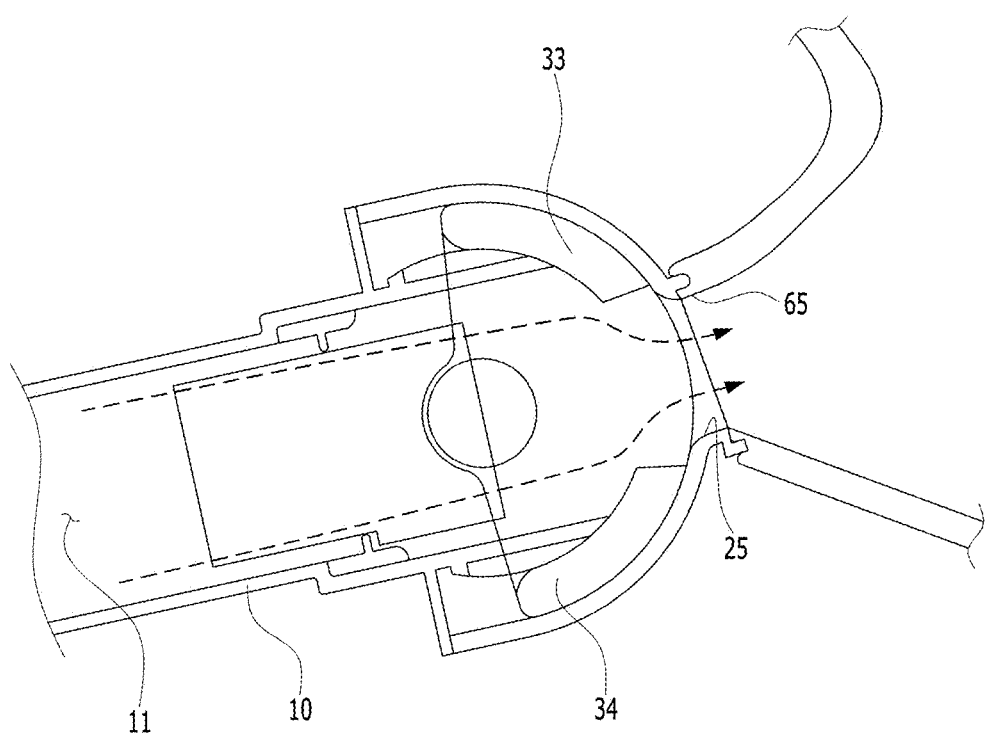
FIG. 9 is a cross-sectional side view illustrating a downward flow state of air by the air ventilation apparatus for a vehicle according to the second embodiment of the present invention.
Figure 10:
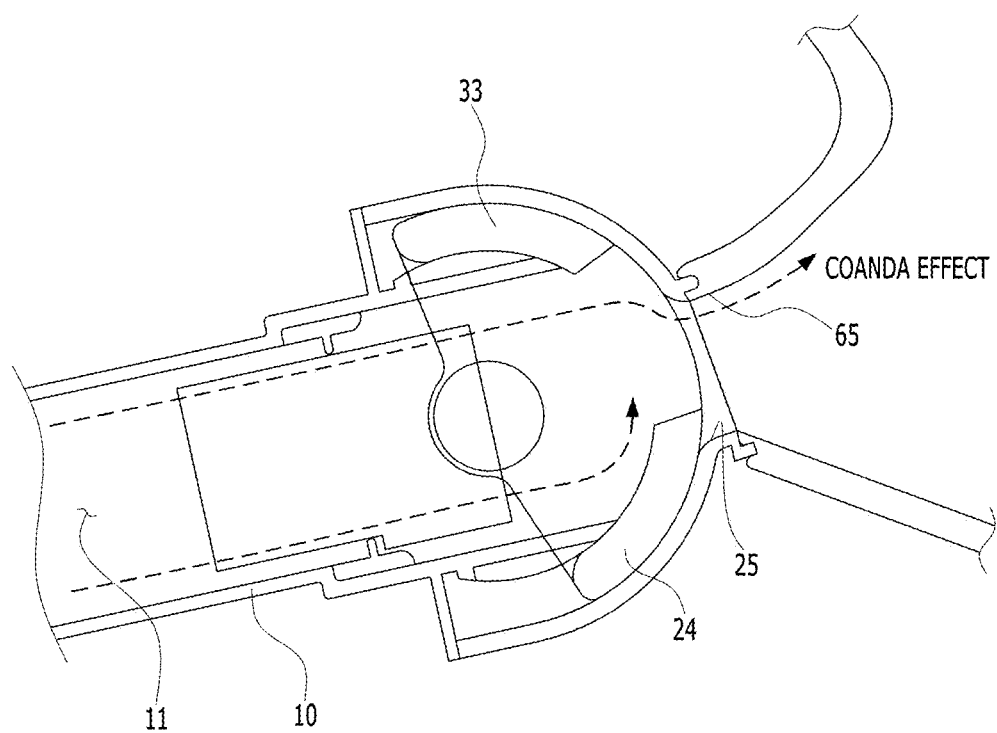
FIG. 10 is a cross-sectional side view illustrating an upward flow state of air by the air ventilation apparatus for a vehicle according to the second embodiment of the present invention.

FIG. 7 is a cross-sectional side view of an air ventilation apparatus for a vehicle according to a second embodiment of the present invention. FIG. 8 is a cross-sectional side view illustrating a linear flow state of air by the air ventilation apparatus for a vehicle according to the second embodiment of the present invention. FIG. 9 is a cross-sectional side view illustrating a downward flow state of air by the air ventilation apparatus for a vehicle according to the second embodiment of the present invention. FIG. 10 is a cross-sectional side view illustrating an upward flow state of air by the air ventilation apparatus for a vehicle according to the second embodiment of the present invention.

In the second embodiment, a cover member 20 and an air guide member 30 are different from those of the first embodiment, and thus, the cover member 20 and the air guide member 30 will be mainly described.

As shown in FIGS. 7 to 10, an inner circumferential surface of the cover member 20, an inner circumferential surface of a communication hole 25, and an inner circumferential surface of a discharge port 65 form a continuous curved surface.

Air supplied from an air inlet 11 turns in the direction of the curved surface formed by the inner circumferential surface of the cover member 20, the inner circumferential surface of the communication hole 25, and the inner circumferential surface of the discharge port 65 and is discharged into a vehicle through the discharge port 65.

The rotating air guide member 30 blocks a curved flow in which the air supplied from the air inlet 11 moves along the inner circumferential surface of the cover member 20 and the inner circumferential surface of the communication hole 25.

In the first embodiment, a curved surface, along which air flows, is formed by the air guide member 30 to generate a curved flow of air, but the second embodiment is different from the first embodiment in that the air guide member 30 blocks the curved flow of air.

A third air guide block 33 is formed at an upper side of an inner circumferential surface of the air guide member 30, and a fourth air guide block 34 is formed at a lower side thereof.

A through-hole 35 is formed between the third air guide block 33 and the fourth air guide block 34.

Due to the rotation of the air guide member 30, one of the third air guide block 33 and the fourth air guide block 34 blocks a curved flow in which air supplied from the air inlet 11 moves along the inner circumferential surface of the cover member 20 and the inner circumferential surface of the communication hole 25.

More specifically, as shown in FIGS. 8 and 10, due to the rotation of the air guide member 30, one of the third air guide block 33 and the fourth air guide block 34 is disposed to protrude further toward a center of the communication hole 25 than the inner circumferential surface of the communication hole 25 to block a curved flow of air supplied from the air inlet 11.

The through-hole 35 is formed to have a vertical size greater than a vertical size of the communication hole 25. Due to the rotation of the air guide member 30, when one of the third air guide block 33 and the fourth air guide block 34 blocks a curved flow of air, the other one thereof is moved away from the communication hole 25 and is inserted into a seating space 26.

Facing surfaces of the third air guide block 33 and the fourth air guide block 34 are formed to form an angled shape together with the inner and outer circumferential surfaces of the cover member 20 rather than a curved surface shape.

Accordingly, through the third air guide block 33 and the fourth air guide block 34, a curved flow of air due to a Coanda effect is not generated.

Hereinafter, an operation process of the present invention configured as described above will be described.

First, when air discharged from the discharge port 65 is to be discharged downward, as shown in FIG. 8, the cover member 20 is rotated clockwise.

When the cover member 20 is rotated clockwise, the third air guide block 33 formed at an upper side is disposed to protrude further toward a center of the communication hole 25 than the inner circumferential surface of the communication hole 25 and to block a curved flow of air supplied from the air inlet 11.

The fourth air guide block 34 positioned at a lower side is inserted into the seating space 26 due to the rotation of the cover member 20. The inner circumferential surface of the cover member 20, the inner circumferential surface of the communication hole 25, and the outside of the inner circumferential surface of the discharge port are maintained in a state in which the continuous curved surface is exposed without any change.

When air is introduced from the air inlet 11, the air moving to an upper side of the air outlet 12 collides with the protruding third air guide block 33 to be turned downward. The air moving to a lower side of the air outlet 12 flows by being attracted to the continuous curved surface formed by the inner circumferential surface of the cover member 20, the inner circumferential surface of the communication hole 25, and the inner circumferential surface of the discharge port 65. In this case, while a Coanda effect is caused, air discharged through the discharge port 65 is discharged by turning in a downward direction in which a curved surface is formed.

As shown in FIG. 9, when air discharged through the discharge port 65 is to be normally discharged, i.e., discharged in a linear flow without turning, the cover member 20 may be rotated to allow both the third air guide block 33 and the fourth air guide block 34 to be disposed adjacent to each other outside the inner circumferential of the communication hole 25.

In this case, a curved connection portion between the inner circumferential surface of the cover member 20 and the inner circumferential surface of the communication hole 25 is concealed by the third air guide block 33 and the fourth air guide block 34.

Accordingly, the air supplied through the air inlet 11 is discharged in a linear flow through the discharge port 65 without the Coanda effect.

As shown in FIG. 10, when air discharged from the discharge port 65 is to be discharged upward, the cover member 20 is rotated counterclockwise.

When the cover member 20 is rotated counterclockwise, the fourth air guide block 34 formed at a lower side is disposed to protrude further toward a center of the communication hole 25 than the inner circumferential surface of the communication hole 25. Accordingly, the fourth air guide block 34 blocks a curved flow of air supplied from the air inlet 11.

The third air guide block 33 is inserted into the seating space 26 due to the rotation of the cover member 20. The inner circumferential surface of the cover member 20, the inner circumferential surface of the communication hole 25, and the outside of the inner circumferential surface of the discharge port 65 are maintained in a state in which the continuous curved surface is exposed without any change.

When air is introduced from the air inlet 11, air moving to the lower side of the air outlet 12 collides with the protruding fourth air guide block 34 to be turned upward. The air moving to the upper side of the air outlet 12 flows by being attracted to the continuous curved surface formed by the inner circumferential surface of the cover member 20, the inner circumferential surface of the communication hole 25, and the inner circumferential surface of the discharge port 65.

In this case, while a Coanda effect is caused, air discharged through the discharge port 65 is discharged by turning in an upward direction in which a curved surface is formed.

As described above, according to the present invention, a vertical direction of air discharged through the discharge port 65 can be controlled through a Coanda effect without a conventional vertical wind direction adjustment wing, thereby reducing a vertical width of the discharge port 65 to implement a slim design.

Other matters are the same and similar to those of the first embodiment, and thus detailed descriptions thereof will be omitted.

An air ventilation apparatus for a vehicle using a Coanda effect of the present invention as described above has the following effects.

By using a Coanda effect, a vertical length of a discharge port for air ventilation can be reduced to make the air ventilation apparatus slim, and a vertical flow of air can also be adjusted.

Since there is no conventional vertical wind direction adjustment wing, a component for blocking the discharge port can be omitted to reduce a pressure of the discharge port, and an internal structure of the air ventilation apparatus can be simplified, thereby implementing the air ventilation apparatus as an ultra-slim air ventilation apparatus in which the vertical length of the discharge port is 15 mm or less.

An air ventilation apparatus for a vehicle using a Coanda effect of the present invention is not limited to the above-described embodiments and may be variously modified and implemented without departing from the technical spirit of the present invention.

What is claimed is:

1. An air ventilation apparatus for a vehicle using a Coanda effect that is mounted inside a board in a vehicle to discharge air into the vehicle through a discharge port formed in the board, the air ventilation apparatus comprising:
    a duct housing having a hollow shape in which an air inlet is formed in one end portion thereof and an air outlet is formed in the other end portion thereof;
    a cover member having one end portion coupled to surround the other end portion of the duct housing and having the other end portion which is coupled to the board and in which a communication hole is formed to communicate with the discharge port; and
    an air guide member which is disposed inside the cover member, is hinge-coupled to the duct housing so as to be vertically rotatable, and has a through-hole through which the air outlet communicates with the communication hole,
    wherein, when an inner circumferential surface of the air guide member, an inner circumferential surface of the communication hole, and an inner circumferential surface of the discharge port form a continuous curved surface due to rotation of the air guide member, air supplied from the air inlet is discharged into the vehicle through the discharge port by turning in a direction in which the continuous curved surface is formed.

2. The air ventilation apparatus of claim 1, wherein a first air guide block is formed at an upper side of the inner circumferential surface of the air guide member,
    a second air guide block is formed at a lower side of the inner circumferential surface of the air guide member, the through-hole is formed between the first air guide block and the second air guide block, and
    one of the first air guide block and the second air guide block forms a continuous curved surface together with the inner circumferential surface of the communication hole and the inner circumferential surface of the discharge port due to the rotation of the air guide member.

3. The air ventilation apparatus of claim 2, wherein a lower surface of the first air guide block and an upper surface of the second air guide block are formed as curved surfaces.

4. The air ventilation apparatus of claim 2, wherein a vertical size of the through-hole is greater than a vertical size of the communication hole, and
    when one of the first air guide block and the second air guide block forms the continuous curved surface together with the inner circumferential surface of the communication hole due to the rotation of the air guide member, the other one thereof moves away from the communication hole.

5. The air ventilation apparatus of claim 4, wherein a connection portion between an inner circumferential surface of the cover member and the communication hole has an angled shape.

6. The air ventilation apparatus of claim 4, wherein the continuous curved surface, which is formed by one of the first air guide block and the second air guide block, the inner circumferential surface of the communication hole, and the inner circumferential surface of the discharge port, is formed to curve more gently than the continuous curved surface formed by an inner circumferential surface of the cover member, the inner circumferential surface of the communication hole, and the inner circumferential surface of the discharge port.

7. The air ventilation apparatus of claim 6, wherein, when both the first air guide block and the second air guide block are spaced apart from the inner circumferential surface of the communication hole, the air supplied from the air inlet is discharged in a linear flow through the discharge port.

8. The air ventilation apparatus of claim 4, wherein the cover member is formed in a dome shape,
    a blocking guide part is formed at the other end portion of the duct housing and is disposed inside the cover member to form the air outlet therein,
    an inner circumferential surface of the cover member and the blocking guide part are spaced apart from each other to form a seating space, and
    when one of the first air guide block and the second air guide block forms the continuous curved surface together with the inner circumferential surface of the communication hole due to the rotation of the air guide member, the other one thereof is moved away from the communication hole and inserted into the seating space formed between the inner circumferential surface of the cover member and the blocking guide part.

9. The air ventilation apparatus of claim 1, further comprising a lateral wind direction adjustment plate mounted to be laterally rotatable inside the duct housing,
    wherein the lateral wind direction adjustment plate is disposed closer to the air inlet than the cover member.

10. The air ventilation apparatus of claim 1, further comprising an actuator configured to vertically rotate the air guide member.

11. An air ventilation apparatus for a vehicle using a Coanda effect that is mounted inside a board in a vehicle to discharge air into the vehicle through a discharge port formed in the board, the air ventilation apparatus comprising:

a duct housing having a hollow shape in which an air inlet is formed in one end portion thereof and an air outlet is formed in the other end portion thereof;

a cover member having one end portion coupled to surround the other end portion of the duct housing and having the other end portion which is coupled to the board and in which a communication hole is formed to communicate with the discharge port; and an air guide member which is disposed inside the cover member, is hinge-coupled to the duct housing so as to be vertically rotatable, and has a through-hole through which the air outlet communicates with the communication hole, wherein an inner circumferential surface of the air guide member, an inner circumferential surface of the communication hole, and an inner circumferential surface of the discharge port form a continuous curved surface so that air supplied from the air inlet is discharged into the vehicle through the discharge port by turning in a direction in which the continuous curved surface is formed, and the air guide member is rotated to block a curved flow in which the air supplied from the air inlet moves along an inner circumferential surface of the cover member and the inner circumferential surface of the communication hole.

12. The air ventilation apparatus of claim 11, wherein a third air guide block is formed at an upper side of the inner circumferential surface of the air guide member, a fourth air guide block is formed at a lower side of the inner circumferential surface of the air guide member, the through-hole is formed between the third air guide block and the fourth air guide block, and due to the rotation of the air guide member, one of the third air guide block and the fourth air guide blocks a curved flow in which the air supplied from the air inlet moves along the inner circumferential surface of the cover member and the inner circumferential surface of the communication hole.

13. The air ventilation apparatus of claim 12, wherein, due to the rotation of the air guide member, one of the third air guide block and the fourth air guide block is disposed to protrude further toward a center of the communication hole than the inner circumferential surface of the communication hole and to block the curved flow of the air supplied from the air inlet.

14. The air ventilation apparatus of claim 13, wherein a vertical size of the through-hole is greater than a vertical size of the communication hole, and when one of the third air guide block and the fourth air guide block blocks the curved flow of the air due to the rotation of the air guide member, the other one thereof moves away from the communication hole.

15. The air ventilation apparatus of claim 14, wherein facing surfaces of the third air guide block and the fourth air guide block form an angled shape together with the inner circumferential surface and an outer circumferential surface of the cover member.

16. The air ventilation apparatus of claim 14, wherein, when the third air guide block and the fourth air guide block are disposed adjacent to each other outside the inner circumferential surface of the communication hole, the air supplied from the air inlet is discharged in a linear flow through the discharge port.

17. The air ventilation apparatus of claim 14, wherein the cover member is formed in a dome shape, a blocking guide part is formed at the other end portion of the duct housing and is disposed inside the cover member to form the air outlet therein, the inner circumferential surface of the cover member and the blocking guide part are spaced apart from each other to form a seating space, and when one of the third air guide block and the fourth air guide block blocks the curved flow of the air due to the rotation of the air guide member, the other one thereof is moved away from the communication hole and inserted into the seating space formed between the inner circumferential surface of the cover member and the blocking guide part.

18. The air ventilation apparatus of claim 11, further comprising a lateral wind direction adjustment plate mounted to be laterally rotatable inside the duct housing, wherein the lateral wind direction adjustment plate is disposed closer to the air inlet than the cover member.

19. The air ventilation apparatus of claim 11, further comprising an actuator configured to vertically rotate the air guide member.

\* \* \* \* \*